Feb. 24, 1942. J. MARKEL ET AL Re. 22,037

ELECTRIC LIGHTING FIXTURE OF THE PORTABLE WALL LAMP TYPE

Original Filed April 24, 1940

INVENTOR
Joseph Markel and Abraham Weinberg
BY
John S. Powers
ATTORNEY

Reissued Feb. 24, 1942

Re. 22,037

UNITED STATES PATENT OFFICE 22,037

ELECTRIC LIGHTING FIXTURE OF THE PORTABLE WALL LAMP TYPE

Joseph Markel and Abraham Weinberg, Buffalo, N. Y., assignors to Markel Electric Products, Inc., Buffalo, N. Y., a corporation of New York Original No. 2,229,704, dated January 28, 1941, Serial No. 331,426, April 24, 1940. Application for reissue September 25, 1941, Serial No. 412,348

3 Claims. (Cl. 248—224)

This is a continuation in part of our co-pending application Serial No. 236,270, filed October 21, 1938.

The invention relates to improvements in electric lighting fixtures of the wall-bracket type and is characterized by features which, although not necessarily limited to such use, render it of particular utility in connection with a fixture of the kind for which no provision was originally made in the wiring system in which it is to be included and which is intended to be mounted at a point remote from an electrical outlet. Heretofore, it has been the practice to suspend such fixtures upon a pin or nail driven into the supporting wall. Fixtures mounted in the manner described have the objection that they tend, particularly when a large part of their weight is located above the pin or nail, to pivot on the suspending means and assume a position at an angle with respect to the desired position.

The principal object of the present invention, therefore, is to overcome the above objection, this objection contemplating a fixture which may be mounted in such a manner that it will be prevented from pivoting out of its normal position.

A further object is a fixture in which provision is made for concealing the mounting means, whereby to render the fixture more pleasing and attractive in appearance.

A still further object is to provide a fixture which is simple in design and which may be mounted with facility.

The invention is illustrated in the accompanying drawing in which.

Figure 1:
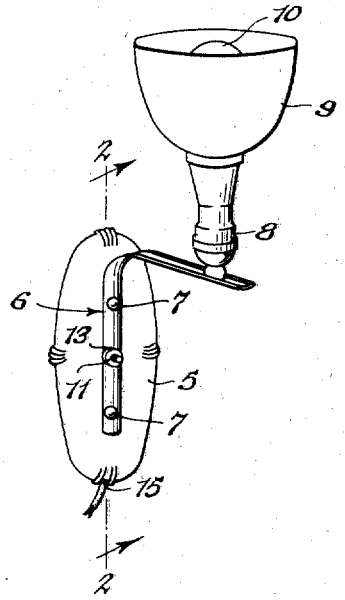
Figure 1 is a perspective view of a fixture embodying the features of the invention.
Figure 2:
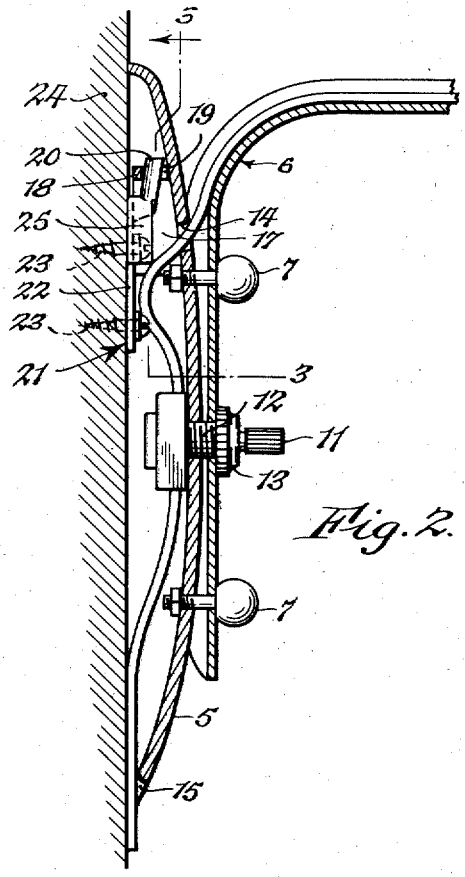
Figure 2 is an enlarged vertical section taken along line 2—2 of Figure 1.

The fixture, as illustrated, includes an ornamental shield 5 which fits against the wall upon which the fixture is mounted and to which the vertical leg of a bracket 6 is secured by nut-and-bolt fastenings 7, the horizontal arm of the bracket carrying the socket 8 and shade 9 of a lamp 10. The shield 5 is preferably in the form of a light metal casting and it carries the switch 11 by which the lamp 10 is connected to power, the said switch having a sleeve-like extension 12 which projects through registering openings formed in the shield and the vertical leg of the bracket and being secured to these parts by an internally threaded element 13 which screws upon the outer end of the extension 12. The wires leading from the switch to the socket 8 pass through an opening 14 in the upper part of the shield while the wires leading from the switch to the electrical outlet pass through a notch 15 formed at the lower end of the shield.

Figure 3:
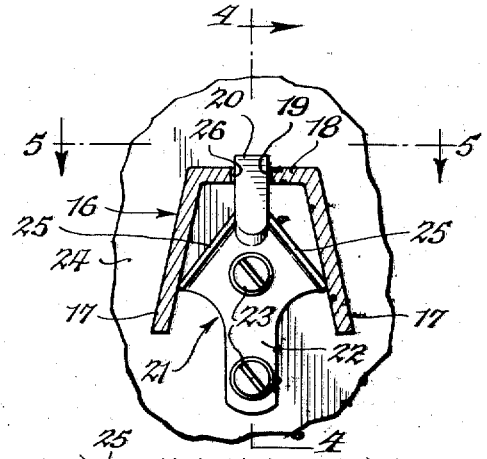
Figure 3 is a fragmentary section taken along line 3—3 of Figure 2.
Figure 4:
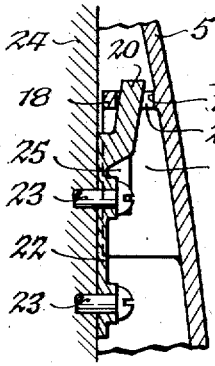
Figure 4 is a vertical section taken along line 4—4 of Figure 3.
Figure 5:
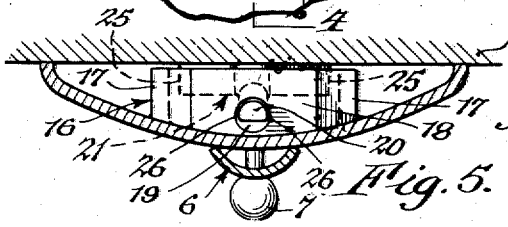
Figure 5 is a horizontal section taken along line 5—5 of Figure 3.

In accordance with the invention an inverted U-shaped rib 16 is formed or provided upon the back of the shield 5. Preferably the rib is integral with the shield, the side walls 17 thereof being straight and converging in the direction of a horizontal top wall 18. An opening 19 which is formed in the wall 18 accommodates the rigid neck 20 of a hanger 21. The latter, as shown and preferred, is in the form of a die-casting and the body 22 thereof is attached by screws 23, or any other suitable means, to the wall 24 upon which the fixture is mounted and is formed with forwardly directed shoulders 25 which converge in the direction of the neck. The shoulders 25 converge toward the neck 20 at sharper angles than the side walls of the rib converge toward the top wall 18 and their lower ends provide point-like areas upon which the side walls of the ribs seat. The neck 20 is inclined upwardly and outwardly with respect to the wall 24, is half-round, with the rounded surface facing the wall 24, and its greatest diameter is less than that of the opening 19, thereby providing clearances 26 (Figure 3) between the sides of the neck and the wall of the opening 19.

In mounting the fixture the hanger 21 is first adjusted so that the neck 20 is vertical and is thereafter secured to the wall 24 in the desired location. The fixture is then manipulated to position the shield 5 over the hanger, the neck 20 being located between the side walls of the rib 16 and below the opening 19 in the top wall. While the shield is held against the wall 24 with the parts in the positions described the fixture is lowered bodily. The neck 20 being smaller than the opening 19 readily enters the latter. The fixture is moved downwardly until the side walls of the rib 16 seat upon the lower ends of the shoulders of the hanger. During such downward movement of the fixture the rear wall of the opening 19 rides along the rear rounded section of the neck 20 and the shield 5 is forced tighter and tighter against the wall 24.

The neck 20 and shoulders 25 of the hanger have three points of contact with the rib 16, the lower ends of the shoulders 25 providing two of these points while the third is provided by the engaged area on the back of the neck 20. The fixture, therefore, has no tendency to rotate upon the hanger. Its only tendency is to remain in the position in which its three points of contact with the hanger are maintained and this, of course, is its correct position. In this connection it will be noted that owing to the difference in diameters between the neck 20 and the opening 19, and the resultant provision of the side clearances 26, the fixture may be rotated slightly in either direction as it is lowered upon the hanger in the manner described so that one of the side walls of the rib 16 may be seated upon each of the shoulders of the hanger. In other words the engaged area on the back of the neck 20 provides a pivotal point which will permit adjustment of the fixture about an axis normal with respect to the axis of the opening 19 to affect seating of one of the side walls of the rib upon each of the shoulders of the hanger. When once arranged upon the hanger in the manner described the fixture is held firmly against the wall 24 and it will remain in such position against vibration and such other influences as cause conventional fixtures to assume positions at an angle with respect to the normal.

The fixture is simple in design, may be mounted with facility and has the further advantage that the mounting means is wholly concealed and does not, therefore, detract from its appearance. It is to be understood that although the shield 5 and bracket 6 are illustrated as separate parts this is intended only by way of example and that the invention not only contemplates the use of shields of various sizes and shapes but also the formation of the shield as an integral part of the bracket.

We claim as our invention:

1. An electric lighting fixture of the wall-bracket type including a shield, a horizontal wall on the back of said shield which is formed with an opening, projections on the back of said shield at opposite sides of, and substantially equally spaced with respect to, a vertical center line through said opening, a hanger which is adapted to be secured against a supporting surface, said hanger having a rigid neck which is adapted to enter said opening and the back of which is angularly inclined upwardly and outwardly with respect to said surface so that the back of the neck will be engaged by the back wall of the opening at a point between the upper and lower ends of the neck to force the shield against said surface, and shoulders on said hanger at opposite sides of said neck, said neck being substantially smaller than said opening so as to provide clearances between the sides of said neck and the side walls of said opening, whereby the back wall of the opening may pivot upon the engaged portion of the back of the neck to enable the fixture to be angularly adjusted about an axis which is normal to the axis of the opening and which passes through the point of contact between the back of the neck and the back wall of the opening to effect the engagement of a point-like area only of one of said projections with one of said shouders and a similar area of the other of said projections with the other of said shoulders to thereby provide three triangularly spaced points of contact between the fixture and the hanger, said points of contact being located in a vertical plane and in such relation with respect to one another that when the fixture has been arranged upon the hanger in the manner described the weight of the fixture will tend to maintain the points of contact between the fixture and the hanger to prevent angular displacement of the latter with reference to the predetermined desired position.

2. An electric lighting fixture of the wall-bracket type including a shield, a rearwardly extending rib on the back of said shield, said rib having a top wall which is formed with an opening and side walls which are substantially equally spaced with respect to a vertical center line through said opening and which converge in the direction of said opening, a hanger which is adapted to be secured against a supporting surface, said hanger having a rigid neck which is adapted to enter said opening and the back of which is angularly inclined upwardly and outwardly with respect to said surface so that the back of the neck will be engaged by the back wall of the opening at a point between the upper and lower ends of the neck to force the shield against said surface, and shoulders on said hanger which converge toward said opening, said neck being substantially smaller than said opening so as to provide clearances between the sides of said neck and the side walls of said opening, whereby the back wall of the opening may pivot upon the engaged portion of the back of the neck to enable the fixture to be angularly adjusted about an axis which is normal to the axis of the opening and which passes through the point of contact between the back of the neck and the back wall of the opening to effect the engagement of a point-like area only of one of said side walls with one of said shoulders and a similar area of the other of said side walls with the other of said shoulders to thereby provide three triangularly spaced points of contact between said rib and said hanger, said points of contact being located in a vertical plane and in such relation with respect to one another that when the fixture has been arranged upon the hanger in the manner described the weight of the fixture will tend to maintain the points of contact between the rib and the hanger to prevent angular displacement of the fixture with reference to the predetermined desired position.

3. A lamp bracket comprising an elongated plaque adapted to be secured upon a wall, a hanger bar for supporting said plaque in vertical position upon a wall, a hook disposed adjacent the upper end of said hanger bar, a portion of said hanger bar being deflected outwardly, said plaque having means formed integrally therewith for engaging said hook and also adapted to engage the deflected portion of said hanger bar so as to hold said plaque in vertical position on the wall.

JOSEPH MARKEL.
ABRAHAM WEINBERG.